US008792863B2

(12) United States Patent
De Oliveira et al.

(10) Patent No.: US 8,792,863 B2
(45) Date of Patent: Jul. 29, 2014

(54) METHOD FOR COLLECTING AND STORING ANNOTATIONS ASSOCIATED TO A VOICE AUDIO DATA

(71) Applicants: Rodrigo De Oliveira, Barcelona (ES); Juan Pablo Carrascal, Barcelona (ES)

(72) Inventors: Rodrigo De Oliveira, Barcelona (ES); Juan Pablo Carrascal, Barcelona (ES)

(73) Assignee: Telefonica, S.A., Madrid (ES)

( * ) Notice: Subject to any disclaimer, the term of this patent is extended or adjusted under 35 U.S.C. 154(b) by 27 days.

(21) Appl. No.: 13/729,235

(22) Filed: Dec. 28, 2012

(65) Prior Publication Data

US 2014/0187208 A1    Jul. 3, 2014

(51) Int. Cl.
*H04W 4/12*    (2009.01)
(52) U.S. Cl.
USPC ............... 455/412.1; 379/142.17; 379/202.01
(58) Field of Classification Search
CPC ....... H04M 3/533; H04M 15/06; H04M 3/56; H04M 3/51
USPC ......... 455/412.1; 370/142.17, 202.01, 265.03
See application file for complete search history.

(56) References Cited

U.S. PATENT DOCUMENTS

| 7,602,892 | B2 | 10/2009 | Cragun |
| 2011/0206198 | A1* | 8/2011 | Freedman et al. ........ 379/265.03 |
| 2012/0321062 | A1* | 12/2012 | Fitzsimmons et al. ... 379/142.17 |

* cited by examiner

*Primary Examiner* — Phuoc H Doan
(74) *Attorney, Agent, or Firm* — Gary J. Gershik; Cooper & Dunham LLP

(57) ABSTRACT

Present invention refers to a method for collecting, organizing and storing annotations associated to a voice audio data. The method comprises providing the voice audio data; transcribing said voice audio data into text data; then, identifying in the text data a piece of information according to a pattern previously set; generating automatically an annotation containing the piece of information identified; assigning automatically a level of relevance for the annotation; asking a user for confirming the automatically assigned level of relevance; if the user does not confirm the automatically assigned level of relevance, assigning a second level of relevance instead of the automatically assigned according to a user input; and storing the annotation associated to the level of relevance assigned. A user can access later to these annotations to recall a phone call conversation or a voice message.

20 Claims, 6 Drawing Sheets

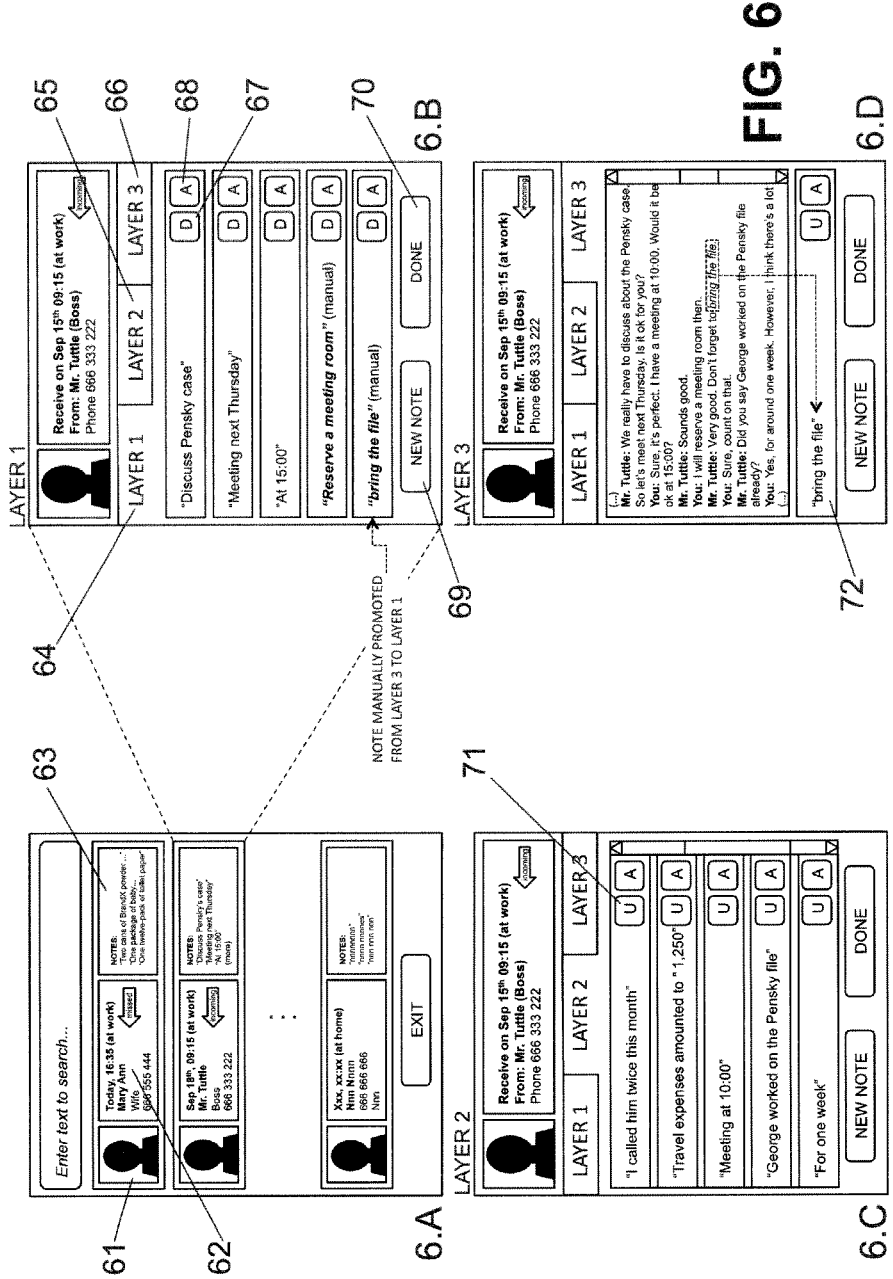

METHOD FOR COLLECTING AND STORING ANNOTATIONS ASSOCIATED TO A VOICE AUDIO DATA

TECHNICAL FIELD OF THE INVENTION

Present invention relates to the field of communications and specifically relates to meaningful annotations of voice communications as a phone call conversation or a voice message.

BACKGROUND OF THE INVENTION

Phone calls generate large amounts of information. The discussion of work-related topics, schedule of time and place of a meeting, annotation of shopping/to-do lists and contact details of a colleague, among others, often involve meaningful pieces of information which are hard to keep in mind after the conversation. Recalling information exchanged in phone conversations is not an easy task and it usually requires some method for memory aid. Traditionally, people would take hand notes in a paper while they were having a phone conversation, but as people use mobile telephones more and more often, it started to appear automatic methods for recording and summarizing phone calls. Personal notes primarily serve as a memory aid for individuals to remember important facts, actions, ideas, and decisions and the annotations may be as simple as highlighting passages or producing a new written product. It is often the case one has to take notes either during—online—or after—offline—cooperative situations, such as in meetings, lectures or phone calls.

Full recordings of phone calls were once considered to address this problem. Nevertheless, it has been demonstrated that it is not an efficient approach since browsing audio data is a lengthy activity that most people prefer to avoid.

Another later solution, avoiding recording full conversations, focuses on the fact that people often choose annotation tools for faster retrieval, even if that implies lower accuracy in the information recall process. Examples of these tools include audio recorders, mobile phone annotation applications, and the usual pen and paper approach. However, it is often the case when these resources are not available during a phone call, or even that either parties have both hands busy, thus preventing the note-taking activity. Furthermore, taking notes during phone calls implies an additional cognitive load that might lead to loss of conversation threads and break the natural information flow.

There are some services that try to address these issues by allowing users to perform certain actions during the call in order to create live annotations or set markers in the recorded calls. However, these solutions have some inconveniences; such as interrupting the natural information flow of a phone conversation, requiring users to perform specific actions during the call, or simply creating a blob of audio information with more data than it is actually needed.

In the recent years, methods for annotation in work-related meetings have been studied. Notes can be used as memory cues for participants to recall events of a meeting rather than being full recordings of the activity but both attention and active participation is required, and taking notes at the same time may become an additional cognitive load that reduces the person's ability to participate.

These needs have been lately supported by different solutions, including electronic annotation tools that leverage desktop computers or mobile devices, as well as the common paper and pen approach, still frequently used in the form of post-it notes, miscellaneous text files, or the corner of other printed documents.

A phone call could be considered as two-people meeting. Nevertheless, these activities are different from work-related meetings. For example, typical phone calls tend to be relatively shorter, they are frequently not planned beforehand and they lack the structure of a meeting, being plenty instead of a series of salutations and informal dialogs. Also, it has been observed that during phone calls, participants often have their hands busy, either by performing another activity (e.g. driving) or by holding the phone, documents or other objects. Despite these differences, specific annotations for phone calls have received little coverage in the prior art.

Finally, some related research efforts had been done in the process of automatic summarization of texts. Summarization aims to include all the concepts included in a body of text, while reducing the actual amount of text. Summarization then is not selective about the pieces of information that should be included in the final result: it must include every piece, but they must occupy less space. Annotation, on the other hand, aims to select very specific pieces from a body of information while ignoring the remaining ones. As example of an existing solution, the U.S. Pat. No. 7,602,892 "Telephony annotation services" provides a simple method for phone call annotation. This method requires users to remember a set of actions that must be taken to trigger the annotation process. It also requires users to interrupt the normal flow of the conversation to perform these actions, so, in consequence, users might lose pieces of information while performing these actions during a call (e.g. in order to setup audio markers or record a live audio note during a phone call). In addition, the nature of the method could significantly reduce precision in annotations (e.g. audio markers created in real-time by users should frequently have an offset time related to the actual important part of the call). And finally, because of its lack of precision, the resulting recorded information is excessive and would require further editing to obtain the actual annotations.

It is therefore, a lack in the prior art of a method or system to automatically annotates pieces related to phone conversations requiring very few—or none—user interaction at the moment of the call. A lack of a method able to automatically identify and annotate important pieces of information—in the long term—that tend not to be considered relevant in first instance whenever they are not part of the original objective of the call. Somehow, it is needed to organize automatically taken annotations avoiding requiring an immediate user interaction, but later the user should has the chance to decide about said organization by giving his approval or reassigning the relevance of the annotations automatically taken.

SUMMARY OF THE INVENTION

Present invention solves the aforementioned problem of annotating pieces of information related to an audio data, generally taken from a phone conversation in order to eventually recall the information by presenting a method for collecting, organizing and storing annotations associated to a voice audio data. Said annotations are automatically taken and organized according to certain relevance, but at some time the user decides to accept the organization or changing the relevance. The method is characterized by the following steps:

a) providing the voice audio data;
    b) transcribing said voice audio data into text data;
    c) identifying in the text data a piece of information according to a pattern previously set;

d) generating automatically an annotation containing the piece of information identified;

e) assigning automatically a level of relevance for the annotation;

f) asking a user for confirming the automatically assigned level of relevance;

g) if the user does not confirm the automatically assigned level of relevance, assigning a second level of relevance instead of the automatically assigned according to a user input;

h) storing the annotation associated to the level of relevance assigned.

A user accessing to the annotations stored may execute the steps of selecting one of the stored annotations and then changing the level of relevance, which had been assigned previously. Annotations require a validation or confirmation by the user before being stored. The method comprises the step of asking for a user input in order to confirm annotations automatically generated. If the user does not confirm the automatically assigned level of relevance, a second level of relevance is assigned instead of the automatically assigned according to a user input. Confirming an annotation may be accept or reject said annotation or also may be assign a certain level of relevance. So that, the user is prompted to interact with the annotations automatically generated.

The invention comprises grouping the annotation according to the level of relevance assigned. The level of relevance is assigned automatically to the annotation generated automatically, but the user can change the level of relevance and it is also possible to generate an annotation manually, which either is assigned automatically a level of relevance or the user assigns a level of relevance manually. These groups classified by their level of relevance can be displayed according to a layer scheme, referring each layer to a different level of relevance.

The voice audio data may be provided by a telecommunication network and specifically, the voice audio data provided may be derived from a phone call conversation or even a voice message. The annotations are stored, in one embodiment of the invention, associated to said phone call conversation or voice message. Then, all the phone call conversations or voice messages are displayed associated to the annotations and are available for the users.

In one embodiment of the invention, there are three levels of relevance a first level of relevance corresponding to annotations manually generated by a user and automatically generated annotations which level of relevance is reassigned to first level by a user, and automatically generated annotations which level of relevance is confirmed as first level by a user; a second level of relevance corresponding to automatically generated annotations which level of relevance is reassigned to second level by a user, and automatically generated annotations which level of relevance is confirmed as second level by a user; and a third level of relevance corresponding to the whole transcription of the voice audio data. Reassigning a level of relevance is to assign a different level of relevance different from the automatically assigned.

A particular embodiment of the invention comprises providing data related to a context of the voice audio data. The context may comprise a selection of at least one of temporal data, geographical data, GPS data, accelerometer data or name of the caller.

In another particular embodiment of the invention, the text pattern for identifying pieces of information comprises text data being numbers, question adverbs, proper names or geographical places. A text pattern-search algorithm is in charge of recognizing meaningful pieces of information according to the previously mentioned types or others.

Another aspect of the invention refers to a computer program product comprising computer program code adapted to perform the method of the invention when said program code is executed on a computer, a digital signal processor, a field-programmable gate array, an application-specific integrated circuit, a micro-processor, a micro-controller, or any other form of programmable hardware.

Finally, a digital data storage medium is provided for storing a computer program product comprising instructions causing a computer executing the program, to perform all steps of the method of the invention.

Proposed invention takes advantage of offering a user-interaction-free annotation of phone calls. It also provides benefits for a long-term preservation of important call information and a fast access to most important information while allowing browse and search on additional is notes information which might become more important in the longer term. All this means a more efficient use of note data than existing solutions.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

The invention describes a process for annotating information that has been discussed during a phone call. Once the annotations have been collected from an audio data, they are organized and stored in an efficient way that makes them available for the users to eventually recall the information.

Embodiments of present invention propose, given that the user is registered in a service with his telephone number, whenever the user dials or receives a phone call, the audio data of that call are recorded and transcribed into text. After this has been done, a pattern-search algorithm looks for certain pieces of information that indicate that useful information has been discussed during the call. Then, a natural language processing algorithm uses these patterns, some contextual information and the data in the transcription to automatically generate meaningful notes that might be useful for eventual recall.

When the user accesses call information (obtained as above described) for the first time, he will be presented with the list of automatically detected notes. The user can then organize the notes based on their relevance. In some embodiments, the notes are represented in different layers according to their relevance, and the layers are used to facilitate the access to note information by the user, who can browse and search information along the layers. An additional layer contains the whole call transcription.

Figure 1:
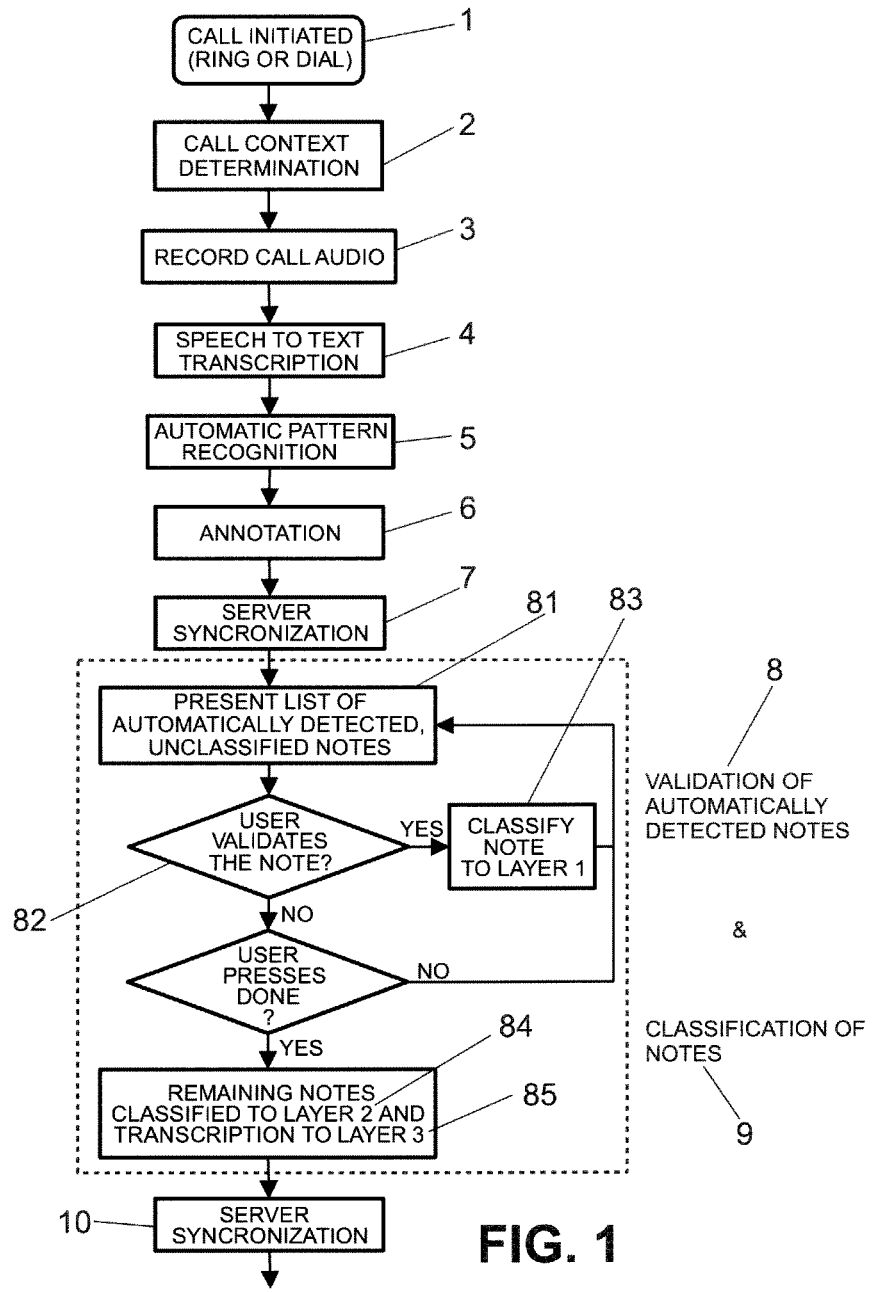
FIG. 1.—shows a flowchart comprising the steps of proposed invention.

Embodiments of the invention may contain a different number of layers. In the specific case of a three-layer implementation, the user selects which of the notes he approves, which are the notes that he considers being more important than the rest. Some embodiments of the invention also allow the user to manually add notes, which, because of their explicit importance, should be put in the first layer in order of relevance (layer 1). After this user intervention, call information is classified in three different but related categories:

Layer 1 notes: notes explicitly chosen, both by "approving" the automatically detected notes or manually taken by the user Layer 2 notes: stores notes which were automatically detected but not approved Layer 3 notes: stores the whole transcription of the phone conversation FIG. 1 shows the steps of one embodiment of the invention. First of all, the user registers his phone number with a telephony service operator that provides the service implementing the method of the invention. The call can be initiated (1) in two scenarios:

Scenario 1 (server only): Phone calls are dialed or received by means of a mobile device (such as a mobile phone), a fixed phone, or desktop computer using a to Voice over IP application. Audio and text recording and processing is done in a server—in the cloud.

Scenario 2 (server+device): Phone calls are dialed or received by means of a mobile device (such as a mobile phone), or a desktop computer using a Voice over IP application. Audio and text recording and processing can be done either in the device (using a mobile or desktop application), or in the server. Answering an incoming call is not a prerequisite. If this is the case, the proposed method can also be applied to voice mail messages.

Next step is the determination of a call context (2). When a call is dialed or the phone device rings, common sensors embedded in the phone device (when available) and call-related data (e.g. party information and time of the call) are used to determine the context of the call (e.g. if it is a work call, location, companions at the time of the call, etc.). Then, the phone call is recorded and stored (3). According to the scenarios mentioned previously, audio data is recorded either in a cloud server or in the device. In fact, all the steps of the method of the invention may run on a cloud or in a device, as mobile telephone, depending on the specific embodiment. Both channels (caller and callee) are recorded separately. This activity ends as soon as the call hangs up or is interrupted for whatever reason.

The speech to text transcription (4), call audio data is analyzed and transcribed to text in the server or in the mobile or desktop application, depending on the scenario. After that, an Automatic Pattern Recognition algorithm (5) running either in the server, mobile device or desktop computer, look for common patterns that have been found to correlate to note taking. Patterns may be, but are not limited to, numbers (e.g. a phone number such as 6559900, an ordinal like "third"), follow-ups to question adverbs ("where", "when", "how", "who", "whom", "what", "which") and proper names (e.g. "John", "Catalunya", "Colombia").

The obtained patterns, as well as contextual data obtain in step 2, are used as a basis to perform semantic analysis and natural language processing in order to obtain meaningful notes (6). For instance, a phone number "6559900" might help obtaining the more meaningful note "John's phone number is 6559900"; the name of a place called "Catalunya" might lead to "Let's meet at Plaza Catalunya". A list with these annotations is built.

If the user employs a desktop or mobile application implementing the proposed method as happens in the scenario 2, call annotation information is synchronized (7) between such application and the server, and associated with the corresponding call log entry. This keeps the data up to date both in the server and the application.

Up here, the steps are triggered by the call (1), but the following steps (validating and classifying notes) can be either also triggered by the call or initiated by the user at any time.

The validation of automatically detected notes (8) depends on the two scenarios presented before. In the Scenario 1, after the call is finished, the user can enter a web application where call data is presented as well as a note validation prompt for the call. In the Scenario 2, the user is however presented only with a note validation prompt right after the call is finished. In both scenarios, the note validation prompt displays the list of the automatically generated notes (81).

The note validation prompt asks (82) the users for ranking the notes according to their relevance. The number of levels of relevance can be configured. A specific case with three levels of relevance just asks the user for accept or reject a note. Accepted notes are associated to a higher level (83) of relevance that rejected notes (84). Being the lowest level of relevance reserved for the whole transcription (85) of the audio data. The validation can be performed at any time after previous steps have finished. A user can validate notes immediately after the call or whenever s/he prefers to do it.

Additionally, the user is able to manually enter new notes at this point, so to add custom information that he might consider important while the call is fresh in his mind.

The classification of notes (9) depends an the level of relevance assigned by the user in the previous step; notes are classified in some embodiments in a multi layer annotation scheme. This way, notes considered to be more important are classified in Layer 1, notes ranked to be less important, or assigned with a lower level of relevance, are classified in Layer 2, notes even less important are in Layer 3 and so on. A last layer is added, containing the whole call transcription. This allows the user to browse the expanded call information if desired. Manually entered notes, being implicitly important, are classified as Layer 1 notes.

Finally, if the user employs a desktop or mobile application implementing the proposed method as described in the scenario 2, call and annotation information is uploaded to the server in order to keep an online backup of the data. This server synchronization (10) allows users to preserve call annotations even if the user decides to access the information from another device.

Figure 2:
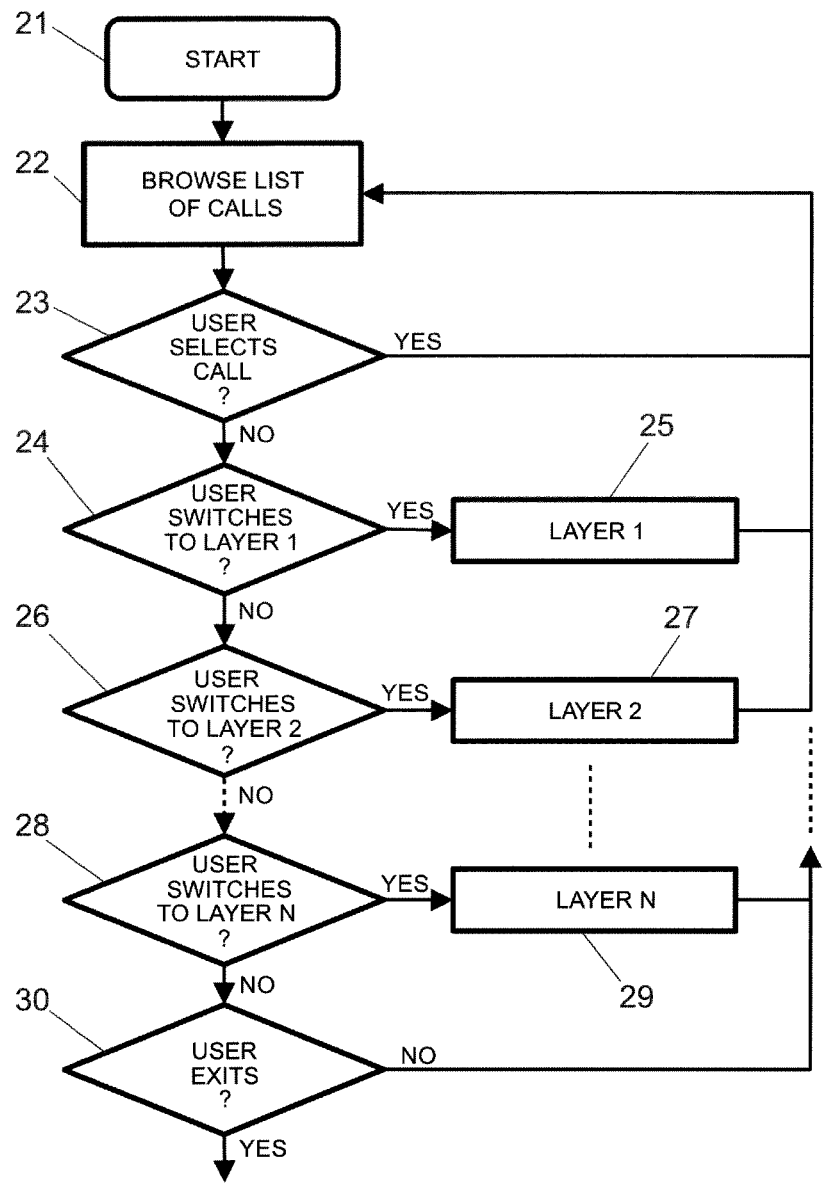
FIG. 2.—shows a flowchart comprising the steps of a user accessing to the information of proposed invention.

FIG. 2 represents the steps followed to manage and consume the data acquired. The process can be started (21), according to the scenarios previously mentioned, by:

i. opening the related mobile/desktop application, or ii. accessing a web application by means of a web browser Then, a list of calls is displayed to the user, and for each call, its related information (such as caller/callee, time, location or any other available contextual information) and a clickable summary of notes. When this summary is clicked for a specific call, the corresponding notes appear.

The search/browse note information step (22) comprises a user browsing the stored notes, being the information presented in a Multilayer Annotation Visualization Interface. It consists in a number of layers that are used to store the call notes. Lower-numbered layers contain more important notes and vice versa (as explained before). The user stays in step 22 unless he selects a call. Then, when a call is selected, the user is asked (24) about accessing to the layer containing the notes more relevant, if he accepts, said layer is displayed (25) to him. If not, next layer in order of relevance is asked (26) to be access, if he accepts said layer is displayed (27) to him. This process is repeated (28) until the user selects a layer "n" to be displayed (29) or until the user rejects accessing the last layer, then the user exits from the method. According to a specific three-layer implementation, the FIGS. 3, 4 and 5 describe the process followed in each layer.

Users can reclassify the notes if they consider their importance have changed at some point in time. If a user considers a note's importance to have decreased, it can be downgraded, so it will be moved to a lower importance layer. If he considers a note's importance have increased, he can upgrade it, moving it to a higher importance layer. Thus, the information is to managed based on users' needs.

Figure 3:
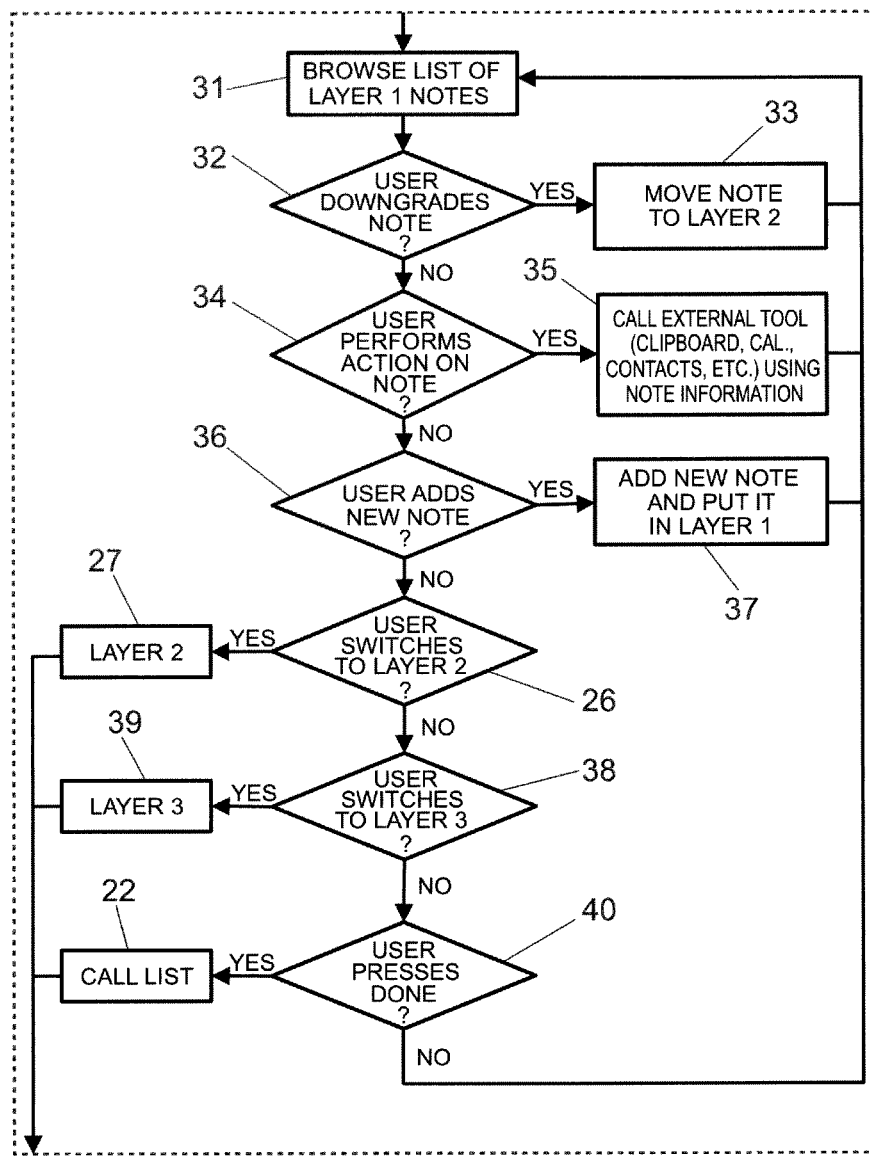
FIG. 3.—shows a flowchart corresponding to one layer of one embodiment of the invention FIG. 4.—shows a flowchart corresponding to one layer of one embodiment of the invention FIG. 5.—shows a flowchart corresponding to one layer of one embodiment of the invention FIG. 6.—shows an example of an interface for browsing notes in an embodiment of the invention

FIG. 3 describes the steps of layer 1, the layer containing the most relevant notes. Once the user has selected to enter in layer 1, the notes comprised by layer 1 are displayed to the user. First step is checking (32) if one of the notes has to be downgraded to a less relevant layer by instructions of the user. If the user has selected a note to be downgraded, then said note is moved to layer 2 (33). In the case that the user is not downgrading any note, next step is checking if the user wants to perform some action (34) on a note. When the user performs an action on a note, the method skip to perform said action as for example adding a contact to a contact list, a date to a calendar or email information (35). If the user does not perform any action on any note, then the next step is asking the user for adding (36) notes, if the user adds (37) a note, said note is automatically put in layer 1. If the user have not added any note, the method finishes checking the actions taken on the notes and depending on the selection of the user (26) (38) goes to other layer (layer 2 (27) or layer 3 (39)) or come back to the call list (22) in the case that the user considers that he has finished browsing (40).

Figure 4:
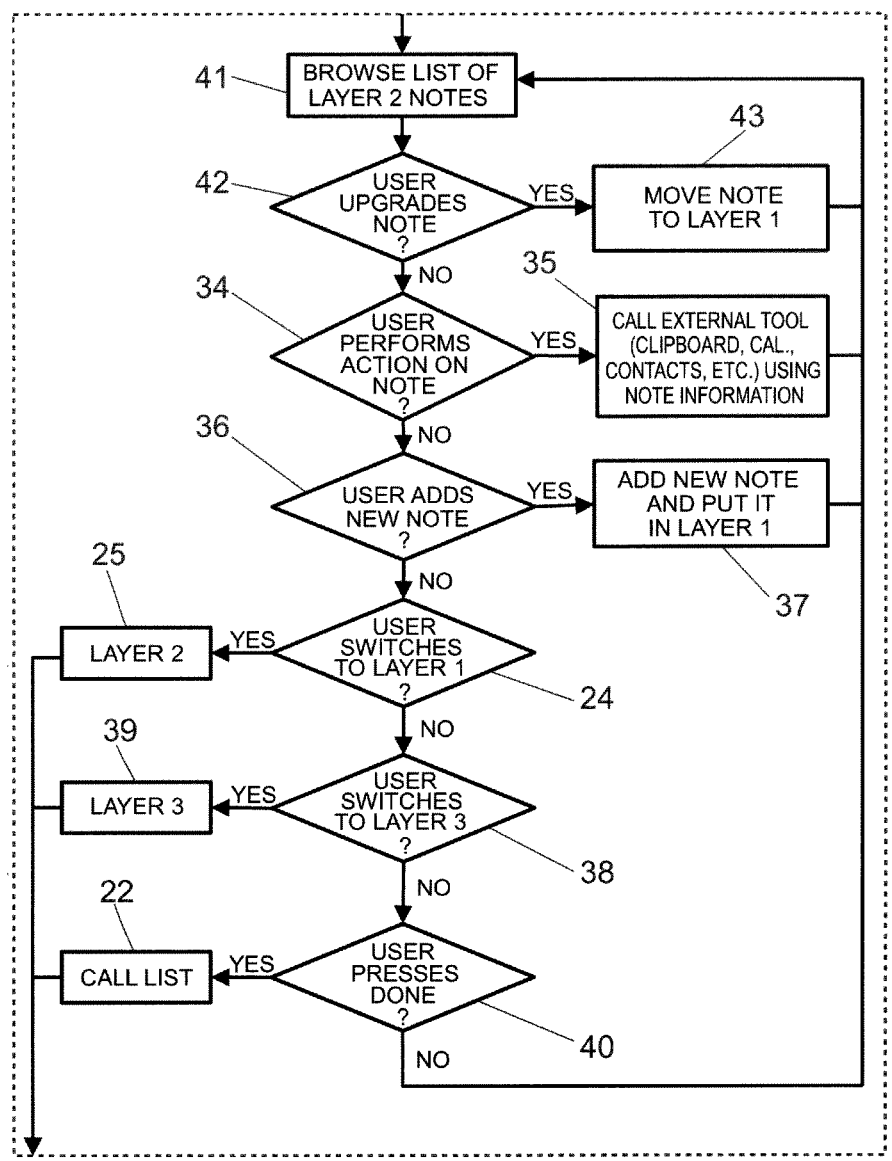

FIG. 4 describes the steps of layer 2. Once the user has selected to switch to layer 2 (27), then a list of layer 2 notes is displayed (41) to the user. The first step comprises checking if a note has to be upgraded (42). If the user has selected a note to be upgraded to layer 1, then said note is moved (43) to layer 1. If the user has not selected any note to be upgraded, the next steps work as in FIG. 3, plus the step of asking the user for switching to layer 1 (24), in that case layer 1 is displayed to the user (25).

Figure 5:
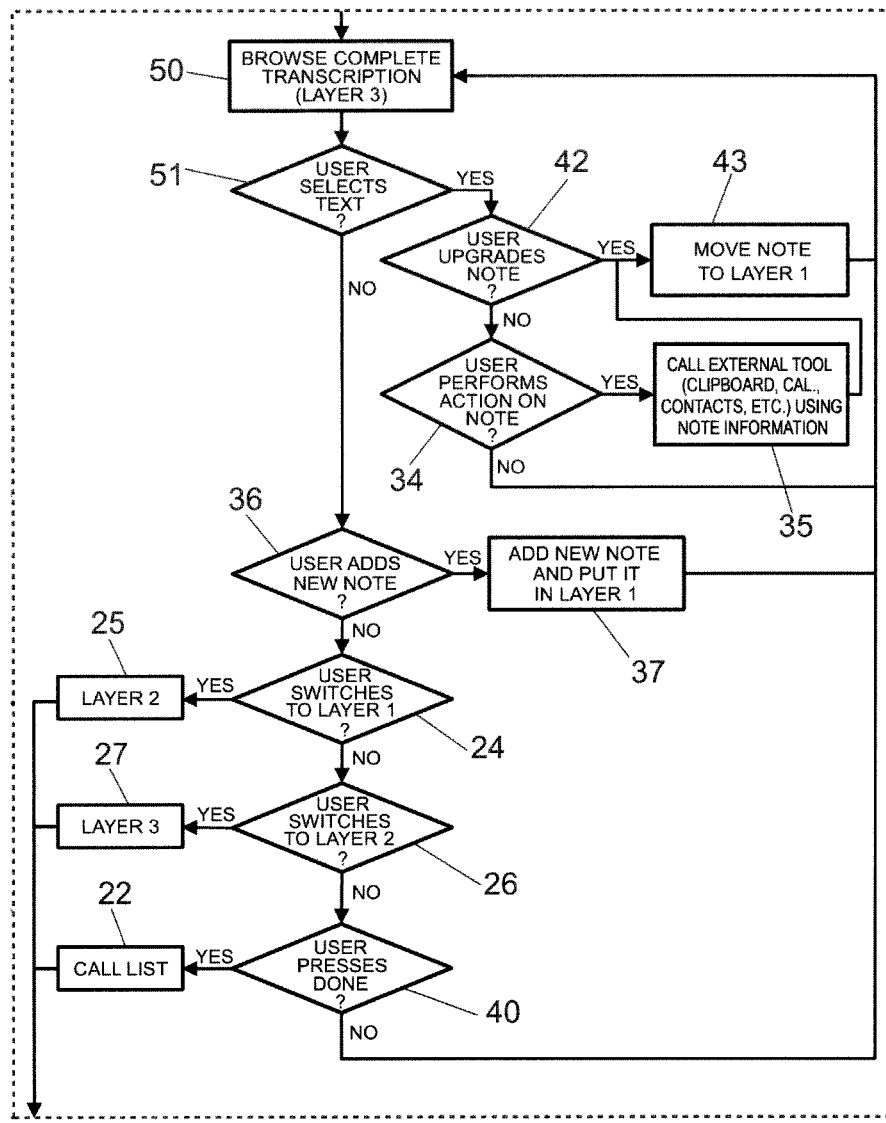

FIG. 5 describes the steps of layer 3. Once the user has selected to switch to layer 3 (39), then a complete transcription of the audio data is displayed (50) to the user. In this layer the user can select a piece of text (51) and then there are two options: upgrading (42) a note containing the piece of text, which is automatically moved (43) to layer 1, or performing an action (34) on the note containing the piece of text. Both options lead to move the note to layer 1.

An example interface of such implementation with three layers, containing three different levels of relevance for the notes taken from the audio data, in a mobile device is shown in FIGS. 6A, 6B, 6C and 6D. FIG. 6A shows a home screen, where the not of calls is displayed associated to a certain contact (61) of the user, context details (62) and notes (63) from layer 1.

FIG. 6B represents the screen that is displayed when the user selects one call from the list displayed in FIG. 6A. In this case the notes of layer 1 (64) are display, but the user can select to be displayed layer 2 (65) or layer 3 (66). All the notes are display associated to a couple of buttons to downgrade (67) a note to layer 2 or perform an action (68) on a note. At the bottom of the screen there are two more buttons for adding (69) new notes manually or to come back (70) to the list of calls of FIG. 6A.

In FIG. 6C, the user has selected "layer 2" (65). The notes assigned with a level of relevance according to layer 2 are displayed associated to a couple of buttons; one button for performing an action (68) on a note, as in FIG. 6B, and one button for upgrading (71) a note and move it to layer 1.

In FIG. 6D, the user has selected "layer 3" (66). The transcription of a whole conversation is displayed and the user has the option of selecting a piece of text (72) and then, executing the same actions than in layer 2, upgrading (71) or performing an action (68) on the selected text.

This layer-based sorting of notes might be changed according to the user's needs, such as ordering by call date and time, caller/callee name, etc.

Finally, three embodiments of the invention, according to the specific embodiment of three-levels multilayer scheme disclosed before, are described below to highlight the benefits of proposed invention in daily situations.

First Embodiment

This first particular embodiment comprises a young user A, who has a profile as an active smartphone user and communicates frequently with work colleagues and friends using his mobile phone. The steps of the invention, specifically for this embodiment:
  Activation: user A decides to subscribe to the service of the invention, called "Annotation Service" offered by his Communication Service Provider to help him remembering information that he frequently discusses during phone calls. Additionally, he installed the companion application to manage the annotation service and system from his mobile phone. He receives a call from a friend so the method is activated.
  Call context determination: the application estimates, by means of reading accelerometer and GPS data on user A's mobile, that he is at his office. According to the call log and information in his contact list, the caller is from his boss, user B.
  Phone call recording and storage: the mobile application records audio of both parties' channels (User A's and user B's). When the call is hung up, both audio files are stored in his mobile phone.
  Speech to text transcription: the audio file is transcribed into text in his mobile.
  Automatic pattern recognition: the Automatic Pattern Recognition algorithm is run on the transcription.
  Annotation: automatically detected patterns are leveraged to create meaningful notes. A list is compiled with these items:
    i. "I called him twice this month"
    ii. "Travel expenses amounted to € 1,250"
    "Discuss Pensky case"
    iv. "Meeting next Thursday"
    v. "I have a meeting at 10:00"
    vi. "At 15:00"
    vii. "George worked on the Pensky file"
    viii. "For one week"
  Server Synchronization: Automatically detected notes are stored and associated with the call log entry in his mobile and all information (call log and notes) is uploaded to the server.

Validation of automatically detected notes: right after previous steps are completed, user A's mobile phone displays a Note Approval Prompt. He approves the notes "Discuss Pensky case" and "Meeting next Thursday".

Classification of notes: the system classifies the notes mentioned in previous steps as Layer 1 notes, Server Synchronization: just after user A closes the application in his mobile, call data (transcription and annotations) are sent to the server. Now user A could use either the application on his mobile or a desktop application to access his calls' notes.

Now, once the information has been collected, organized and stored, to manage and consume the data acquired, the following steps are comprised in the process:

The Note Approval Prompt goes away and user A keeps working on the Annotation System without closing it.

Search/browse note information: user A reviews the three Layers to be sure all the information he needs is in the right place.

Note upgrading and downgrading: while browsing Layer 2 he realizes he did not take note of the time of the meeting, so he upgrades the note "At 15:00". The system sends this note to Layer 1, while keeping the remaining notes in Layer 2.

Manual annotation: while in Layer 1, user A adds the note "Reserve a meeting room", to complement the notes in Layer 1. He also knows that there is something else he needs to take into account from the previous conversation. He goes to Layer 3 and browses the transcription. Then select the text "bring the file" and upgrades it. This text is sent as a note to Layer 1.

Taking action on notes: user A selects the option to send the note "Discuss Pensky case" to his calendar application. He repeats this step for the remaining notes to complement the meeting data in the calendar application.

Second Embodiment

The second embodiment comprises a user C having a senior profile as a processed meat distributor, who uses the fixed phone in his office to receive orders from local restaurants and small supermarkets. He also uses a desktop computer to manage orders, accounting, and his clients contact information.

Activation: user C frequently receives calls asking for a variety of products, so he decided to hire the Annotation Service to his Communication Service Provider to better remember the high amount of orders he receives every week. Given that user C hired the service, every call he makes or receives is monitored by the annotation server. User C receives a call from a local restaurant owner, user D.

Call context determination: the server detects the number of the call and determines it comes from user C's client user D. It also checks the time and determines it is done during working hours.

Phone call recording and storage: the call is monitored and recorded in the server. After hanging up, the call is stored in the cloud.

Speech to text transcription: the server analyzes and transcribed the speech data to text data.

Automatic pattern recognition: the server runs the Automatic Pattern Recognition algorithm, and found the notes "fifty kilos", "Serrano", "twenty kilos", "which", "Riojano", and "Friday".

Annotation: the semantic and natural language analysis extracts the following notes from based on the found patterns, the caller, and on the fact that the call was done during work hours:
  i. "Fifty kilos of jamón Serrano"
  ii. "Twenty kilos of chorizo. Kind: Riojano"
  iii. "Due to next Friday"
  iv. "For user D"

Server Synchronization: given that in this scenario the user does not use a desktop or mobile application, it is not necessary to perform this step.

Validation of automatically detected notes: by the end of the day, user C accesses the web application to check the calls he received that day. He browses the list of calls and opens the one received from his client user D. He clicks on the approval button of all notes, and manually enters a new note "Chorizos should be smoked". This note is automatically put in Layer 1.

Classification of notes: the backend of the web application, based on user C's choices, classifies all the automatically detected notes, as well as the manually entered note as Layer 1 notes and the whole transcription as a Layer 3 note.

Server Synchronization: again, there is no need for synchronization between an application and the server. However, at this point all call information is stored in the server, so it can be eventually accessed by the web application or other dedicated mobile or desktop applications if needed.

Now, once the information has been collected, organized and stored, to manage and consume the data acquired, the following steps are comprised in the process:

Later, after shipping the ham and chorizos to user D, user C enters the web application again.

Search/browse note information: he browses the call list in the application and find user D's call.

Note upgrading and downgrading: user C downgrades all notes, so preventing them to appear in Layer 1, and sending them to Layer 2.

Manual annotation: user C does not take any additional notes.

Taking action on notes: user C selects the note containing the text "Fifty kilos of jamón Serrano", now in Layer 2, and selects the action "copy to clipboard". He pastes the content of the note in an inventory application. He repeats the process for the note, which contains "Twenty kilos of chorizo. Kind: Riojano".

Third Embodiment

This third embodiment show how the method can be used in situations when the callee is not available, thus requiring processing of the voice mail message left by the caller. This embodiment comprises a user E. The profile of user E is a young executive frequently discusses over the phone with a user F and work colleagues. He installed a companion application on her mobile. Due to the multiple meetings at work, he frequently cannot answer his phone, so he relies on voice mail.

Activation: user E is in a meeting, thus he turns the ringer on her phone off. While at the meeting, user F calls him to ask him to buy some groceries on his way home. Since user E does not answer, user F leaves a message in his voice mail. This triggers the Annotation Service implementing the proposed method.

Call context determination: the call is detected to come from user E's home phone, and since it was work time and user E had her ringer off, the Annotation Service determines he was at work.

Phone call recording and storage: after user E's husband finishes recording the voice mail message and hangs the phone, the audio of the call (only one channel in this case) is stored.

Speech to text transcription: call audio data is transcribed into text.

Automatic pattern recognition: after the server has run the Automatic Pattern Recognition algorithm, it detects the words "two", "BrandX", "one", and "twelve".

Annotation: after the semantic analysis, these notes are generated by the Annotation Service:
 i. "Two cans of BrandX powder milk"
 ii. "One package of baby wipes"
 iii. "One twelve-pack of toilet paper"
 iv. "Michelle says hello"

Server Synchronization: the server pushes automatic annotation data to user E's mobile. It is associated to the corresponding call log entry.

Validation of automatically detected notes: after the meeting, user E sees that he has a lost call, which left a new voice mail message. Given that he has hired the Annotation Service, the application in his mobile also displays the call annotations so they are ready for revision in his mobile. He approves first three notes.

Classification of notes: first three notes are classified as Layer 1 notes, fourth note is classified as Layer 2 and the whole transcription receives Layer 3 classification.

Server Synchronization: new information, including note classification is uploaded and updated in the server.

Now, once the information has been collected, organized and stored, to manage and consume the data acquired, the following steps are comprised in the process:

User E opens the Annotation System application to remember what he has to buy before going home.

Search/browse note information: he browses the calls and goes to user F's call and opens its associated notes.

Note upgrading and downgrading: he does not upgrade nor downgrade any note at the moment.

Manual annotation: he adds a manual note: "milk, bread and eggs", since he knew he need to buy those as well. This note is automatically put in Layer 1.

Taking action on notes: since the list of groceries he has to buy is comfortably stored in the Layer 1 of the Annotation System application, he does not have to take any additional actions.

The invention claimed is:

1. A computer-implemented method for collecting, organizing and storing annotations associated to a voice audio data characterized by the steps of:
 a) providing the voice audio data;
 b) transcribing said voice audio data into text data;
 c) identifying at least one text pattern from the text data according to a pattern previously set;
 d) generating automatically an annotation containing the text pattern identified;
 e) assigning automatically a level of relevance for the annotation;
 f) asking a user for confirming the automatically assigned level of relevance;
 g) if the user does not confirm the automatically assigned level of relevance, assigning a second level of relevance instead of the automatically assigned according to a user input;
 h) storing the annotation associated to the level of relevance assigned.

2. The method according to claim 1 further comprising a user generating an annotation manually.

3. The method according to claim 2, wherein there are three levels of relevance: a first level of relevance corresponding to annotations manually generated by a user and automatically generated annotations which level of relevance is reassigned to first level by a user, and automatically generated annotations which level of relevance is confirmed as first level by a user; a second level of relevance corresponding to automatically generated annotations which level of relevance is reassigned to second level by a user, and automatically generated annotations which level of relevance is confirmed as second level by a user; and a third level of relevance corresponding to the whole transcription of the voice audio data.

4. The method according to claim 2, wherein the voice audio data is derived from a phone call conversation or a voice message.

5. The method according to claim 4 further comprising grouping the annotations according to the level of relevance assigned.

6. The method according to claim 5, wherein there are three levels of relevance: a first level of relevance corresponding to annotations manually generated by a user and automatically generated annotations which level of relevance is reassigned to first level by a user, and automatically generated annotations which level of relevance is confirmed as first level by a user; a second level of relevance corresponding to automatically generated annotations which level of relevance is reassigned to second level by a user, and automatically generated annotations which level of relevance is confirmed as second level by a user; and a third level of relevance corresponding to the whole transcription of the voice audio data.

7. The method according to claim 6 further comprising providing data related to a context of the voice audio data.

8. The method according to claim 7 further comprising running the steps of the method in a mobile telephone.

9. The method according to claim 1, wherein the voice audio data is derived from a phone call conversation or a voice message.

10. The method according to claim 9, wherein the phone call conversation or voice message is displayed associated to the annotation stored.

11. The method according to claim 1 further comprising grouping the annotations according to the level of relevance assigned.

12. The method according to claim 11 wherein the groups of annotations are displayed according to a layer scheme, referring each layer to a different level of relevance.

13. The method according to claim 1 further comprising providing data related to a context of the voice audio data.

14. The method according to claim 13 wherein the context comprises a selection of at least one of temporal data, geographical data, GPS data, accelerometer data or to name of the caller.

15. The method according to claim 1, wherein the text patterns comprise text data being numbers, question adverbs, proper names or geographical places.

16. The method according to claim 1, wherein the voice audio data is provided by a telecommunication network.

17. The method according to claim 1 further comprising uploading the voice audio data to a server.

18. The method according to claim 1 further comprising running the steps of the method in a mobile telephone.

19. A computer program product comprising computer program code adapted to perform the method according to claim 1 when said program code is executed on a computer, a digital signal processor, a field-programmable gate array, an application-specific integrated circuit, a micro-processor, a micro-controller, or any other form of programmable hardware.

20. A digital data storage medium storing a computer program product comprising instructions causing a computer executing the program, to perform all steps of a method according to claim.

* * * * *